Nov. 25, 1969  R. L. FRYER ET AL  3,479,997
INLET VALVE FOR INTERNAL COMBUSTION ENGINE
Filed May 13, 1968
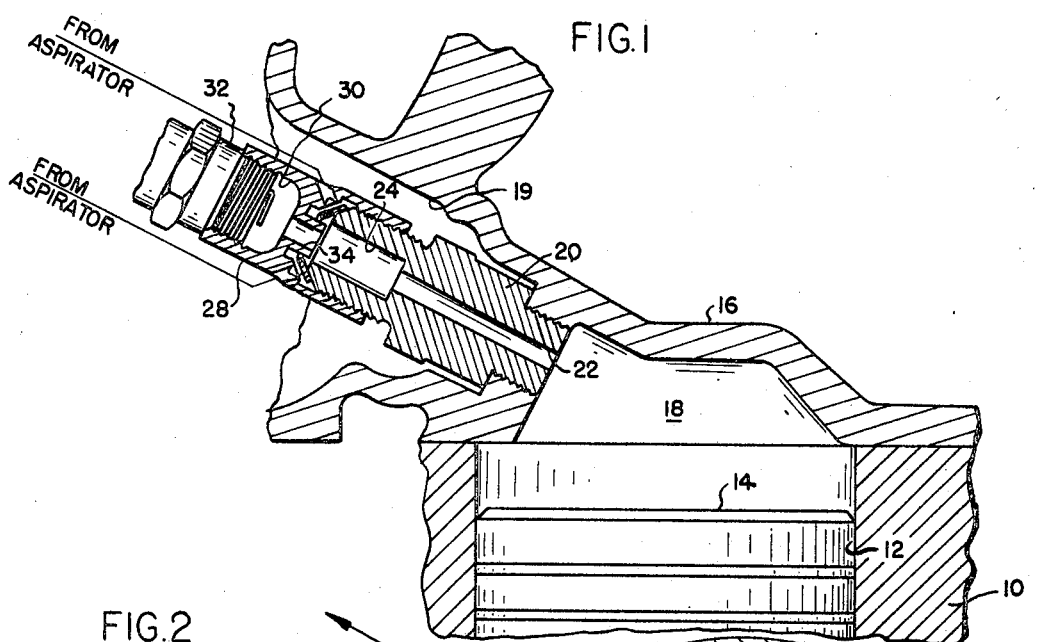
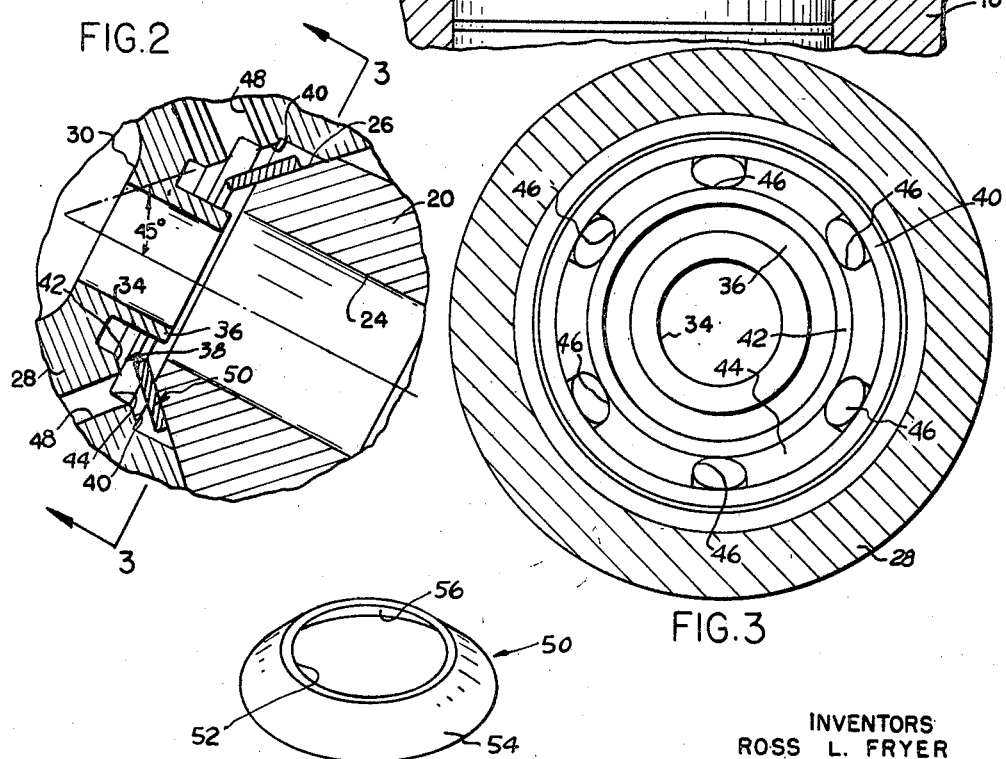
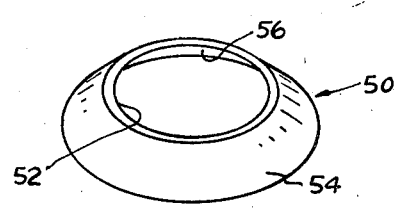
INVENTORS
ROSS L. FRYER
DENNIS C. HILL
BY *Hauke, Krass, Gifford, & Patalidis*
ATTORNEYS United States Patent Office 3,479,997
Patented Nov. 25, 1969

1

3,479,997
INLET VALVE FOR INTERNAL COMBUSTION ENGINE
Ross L. Fryer, Grosse Pointe Woods, and Dennis C. Hill, Southfield, Mich., assignors, by mesne assignments, to Continental Motors Corporation, Detroit, Mich., a corporation of Virginia
Filed May 13, 1968, Ser. No. 728,621
Int. Cl. F02b 23/00; F02p 23/00
U.S. Cl. 123—75
8 Claims

ABSTRACT OF THE DISCLOSURE

An internal combustion engine having an auxiliary or precombustion chamber connected with the primary combustion chamber, and an ignition chamber connected with the auxiliary combustion chamber by a passage having one end opening into the ignition chamber and its other end terminating in a tubular heat shield which extends into the auxiliary combustion chamber. The body member which houses the ignition chamber has a pair of integral, annular, ported valve seats formed around the heat shield for the admission of a fuel mixture into the auxiliary chamber. A pressure-responsive, flapper valve having a central opening through which the heat shield extends, is supported for motion adjacent the valve seats between a closed position in which it closes the ports and an open position in which it is spaced from the valve seats to open the ports for the admission of the fuel mixture.

BACKGROUND OF THE INVENTION

This invention relates to spark ignition internal combustion engines and more specifically to such an engine having an auxiliary combustion chamber connected with the main combustion chamber which receives a pilot air-fuel mixture for ignition by a spark plug.

Internal combustion engines employing an auxiliary or precombustion chamber which is connected to the main combustion chamber of the engine and which receives a fuel-air mixture for ignition by a spark plug disposed adjacent the auxiliary chamber, are well known to those skilled in the art. An engine of this general configuration is disclosed in Patent No. 3,124,113 issued Mar. 10, 1964 in which the auxiliary combustion chamber is formed in a tubular housing, having one end mounted on the cylinder head of the engine and its opposite end adapted for supporting the flame-producing end of a spark plug. A valve insert is disposed in the tubular member between its inner and outer ends to define an auxiliary combustion chamber adjacent its inner end and an ignition chamber adjacent its outer end. The valve insert provides a passage of reduced diameter connecting the two chambers, and has a truncated, spherical seat on its inner end for engaging a flapper valve having a truncated, spherical cross-section which moves toward and away from the seat in response to a pressure differential created across the valve. A series of ports in the valve insert provide means for the admission of the pilot fuel mixture into the auxiliary chamber.

The broad purpose of the present invention is to provide several improvements in an engine of this type.

SUMMARY OF THE INVENTION

The preferred embodiment of the present invention, which will subsequently be described in greater detail, takes the form of an engine having a tubular adapter member with one end threadably mounted in the engine's cylinder head and its opposite, outer end supporting a generally tubular body member. A spark plug is mounted on the outer end of the body member with its flame-producing end pointed toward the auxiliary combustion

2 chamber which is formed at the outer end of the adapter member. The bore of the body member is internally narrowed to form a passage connecting an ignition chamber in the body member which contains the spark plug and the auxiliary combustion chamber. This connecting passage includes a tubular heat shield which extends into the auxiliary combustion chamber to protect an annular valve seat which is integrally formed in the body member around the heat shield. The valve seat is generally frusto-conical in shape with an annular recess dividing the valve-seating surface of the valve seat into a pair of annular seats. A series of ports open into the recess and provide a connection with a source of a fuel mixture.

The annular valve has a frusto-conical cross section and a central opening through which the heat shield extends. The valve is movable toward and away from the valve seats in response to a changing pressure differential created across the valve during the course of the combustion cycle.

The configuration of the preferred valve and its double seat provides a number of advantages over the prior art. By forming the valve seat as an integral part of the body member, as opposed to a valve insert arrangement, heat transfers from the valve seats more efficiently thereby obviating the possibility of heat distortion of the seats. By forming the valve-engaging surfaces of the valve seat into a pair of frusto-conical surfaces formed on opposite sides of the fuel admission ports, a higher and more uniform seating pressure is produced between the valve and its seat. Furthermore the conical valve is much easier to manufacture as opposed to a valve having a truncated, spherical cross section.

Another major structural difference between the preferred valve seat and the prior art lies in the tubular heat shield which extends through the valve to protect the surfaces of the valve seats as well as the major portion of the valve itself from the heat that is delivered through the passage connecting the ignition chamber and the auxiliary combustion chamber.

The aforementioned and other advantages of the present invention will readily become apparent to those skilled in the art to which the invention pertains upon reference to the following detailed description.

DESCRIPTION OF THE DRAWING

The description refers to the accompanying drawing in which like reference characters refer to like parts throughout the several views and in which:

FIGURE 1 is a sectional, fragmentary view through a spark-ignition, internal combustion engine having a double valve seat between the ignition chamber and the auxiliary combustion chamber in accordance with our invention;

FIGURE 2 is an enlarged, fragmentary view of the valve and the double seat of FIGURE 1;

FIGURE 3 is a transverse, sectional view of the double seated construction and the fuel admission ports as seen along lines 3—3 of FIGURE 2, with the valve removed; and FIGURE 4 is a perspective view of the valve separated from the engine.

DESCRIPTION OF THE PREFERRED EMBODIMENT

Referring to the drawings, FIGURE 1 shows an engine having a lock 10 with a cylindrical bore 12 formed therein. A piston 14 is reciprocally mounted in the bore 12 and connected to a crankshaft (not shown) by a suitable means. A cylinder head 16 is mounted at the upper end of the block 10 to close off the bore 12 and form a variable volume combustion chamber 18 between the head and the piston 14.

An adapter 20 is threadably mounted on the head 16 and has an elongated passage 22 having one end opening into the combustion chamber 18 and its opposite end terminating in an auxiliary combustion chamber 24. As best seen in FIGURE 2, the outer end of the adapter 20 has a frusto-conical surface 26.

A generally tubular body member 28 is threadably mounted on the outer end of the adapter 20 and has a cavity forming an ignition chamber 30 which is internally threaded for supporting a flame-producing spark plug 32. The body member 28 has a reduced mid-section defining a passage 34 which is aligned with the passage 22 in the adapter. The inner end of the passage 34 opens into the ignition chamber 30 and its outer end terminates in a tubular heat shield 36. The passage 34 provides communication between the ignition chamber 30 and the auxiliary combustion chamber 24.

The body member 28 has an integral, annular valve seat means 38 formed around the tubular heat shield 36. The valve seat means includes a pair of annular frusto-conical valve seating surfaces 40 and 42 separated by an annular recess 44. The seating surfaces 40 and 42 are formed symmetrically about the axis of the tubular heat shield 36 on the frustrum of a cone having a surface of revolution which diverges in the direction toward the main combustion chamber 18 at an angle about 45° with respect to its axis.

Six annularly spaced ports 46 open into the recess 44, each port being connected by a laterally directed passage 48 to an aspirator (not shown), which provides a source of a suitable fuel-air mixture. The passages 48 admit the fuel mixture through the ports 46 in a direction perpendicular to the surface of the valve surfaces 40 and 42.

It can be seen that because the valve seat means 38 forms an integral part of the body 30 that there is no barrier to the efficient dissipation of heat flow from the surfaces 40 and 42 to the externally cooled surfaces of the body 28.

As best seen in FIGURES 2 and 4, an annular valve member 50 having a central opening 52, is disposed between the valve seat means 38 and the frusto-conical surface 26 of the adapter in such a manner that the tubular heat shield 36 extends through its central opening 52. The valve member has an outer frusto-conical surface 54 which is complementary with the valve surfaces 40 and 42 and engageable therewith in a closed position in which it closes off the ports 48. The valve member 52 also has an inner frusto-conical surface 56 which is generally complementary with the frusto-conical surface 26 of the adapter and engageable therewith when it is in an open position and spaced from the valve seat 38.

When the valve member 50 is in its closed position, it is seated in surface to surface relationship with both the frusto-conical valve seat surfaces 40 and 42 which have a fairly low surface area thereby producing a high seating pressure with the valve member which obviates the possibility of leakage around the valve, as well as providing means for dissipating heat from the valve member 50 to the two seating surfaces 40 and 42.

In its open position, the inner frusto-conical surface 56 of the valve member abuts the surface 26 of the adapter. Preferably a small differential angle is formed between the surface 26 of the adapter and the inner surface of the valve to minimize the build-up of any gummy stickiness produced by combustion deposits.

The preferred valve arrangement permits a cooling agent to be applied as close to the valve and its seat as possible to reduce the problem of heat distortion. The heat flow from both surfaces of the valve seat means 38 is direct with no heat dams or other impediments to efficient heat dissipation. The tubular heat shield 36 acts as a flame deflector and is located to prevent the direct impinging upon the valve by hot gasses exiting from the ignition chamber as well as hot and burning gasses moving in the opposite direction.

It is to be understood that although we have described but one embodiment of our invention, various changes and revisions can be made therein without departing from the spirit of the invention as expressed in the scope of the appended claims.

Having described our invention, we claim:
1. In an internal combustion engine having a primary combustion chamber, the combination comprising:
 (a) structure forming an auxiliary combustion chamber connected with said primary combustion chamber;
 (b) a body member on said structure having:
  (1) an ignition chamber;
  (2) a passage having an inner end opening into said ignition chamber and an outer end opening into said auxiliary combustion chamber;
  (3) annular valve seat means formed integrally in said body member and around the outer end of said passage, said valve seat means having a pair of annular valve seating surfaces forming the surface of a cone and separated from one another by an annular recess;
  (4) said recess having a series of ports connected to a source of a fuel mixture;
  (5) a valve member having an annular surface engageable with said pair of valve seating surfaces, and supported for motion between a closed position in which it engages the valve seating surfaces to block flow through said ports, and an open position in which it is spaced from the valve seating surfaces for the admission of the fuel mixture into the auxiliary chamber, said valve member having a central opening aligned with the passage connecting the ignition chamber and the auxiliary combustion chamber; and
 (c) a spark plug mounted on said body member with its flame-producing end in said ignition chamber.
2. The combination as defined in claim 1, wherein said valve member has a frusto-conical cross section with an annular outer surface engaged with the seating surfaces of said valve seat means when the valve member is in its closed position.
3. The combination as defined in claim 1, wherein the outer end of said passage terminates in a tubular heat shield which extends through the central opening in the valve member to protect the valve seat means from the heat of hot gasses flowing through said passage.
4. The combination as defined in claim 1, wherein the structure forming said auxiliary combustion chamber has an abutment surface spaced from the valve seat means in the direction of motion of the valve member as it moves to its open position, said abutment surface being engagable with said valve member to define its open position.
5. The combination as defined in claim 4, wherein said valve member has an annular frusto-conical inner surface engagable with the abutment surface of said structure, and said abutment surface is formed generally complementary to the inner surface of said valve member.
6. In an internal combustion engine having a primary combustion chamber, the combination comprising:
 (a) structure forming an auxiliary combustion chamber connected with said primary combustion chamber,
 (b) a body member on said structure having:
  (1) an ignition chamber,
  (2) a passage having an inner end opening into said ignition chamber and an outer end terminating in an integral, tubular heat shield which opens into said auxiliary combustion chamber,
  (3) annular valve seat means integrally formed in said body member adjacent the outer end of said passage and symmetrically around said tubular heat shield so that the shield protects the valve seat means from the heat of hot gasses flowing between the ignition chamber and the auxiliary combustion chamber, (4) a series of ports opening into said valve seat means and connected to a source of a fuel mixture, (c) a valve member having an annular surface engagable with said valve seat means, said valve member being supported for motion between a closed position in which it engages the valve seat means to close off flow through said ports and an open position in which it is spaced from the valve seat means for the admission of the fuel mixture into the auxiliary combustion chamber, and (d) a spark plug mounted on said body member with its flame-producing end disposed in said ignition chamber.

7. The combination as defined in claim 6, wherein said valve seat means has frusto-conical surfaces engageable with complementary frusto-conical surfaces on the valve member.

8. The combination as defined in claim 6, wherein the internal combustion engine has a cylinder head and the structure forming the auxiliary combustion chamber is mounted on the cylinder head with the auxiliary combustion chamber in communication with the primary combustion chamber of the engine.

References Cited

UNITED STATES PATENTS

| | | |
|---|---|---|
| 1,998,785 | 4/1935 | Mock. |
| 2,098,875 | 11/1937 | Mallory. |
| 2,110,888 | 3/1938 | Meredith. |
| 2,983,268 | 5/1961 | Heintz _____ 123—191 |
| 3,066,661 | 12/1962 | May. |
| 3,066,662 | 12/1962 | May et al. _____ 123—143 |
| 3,124,113 | 3/1964 | May et al. |

WENDELL E. BURNS, Primary Examiner

U.S. Cl. X.R.

123—32, 143, 188, 191